United States Patent [19]
Allina

[11] Patent Number: 5,596,468
[45] Date of Patent: Jan. 21, 1997

[54] TRANSIENT VOLTAGE SURGE SUPPRESSION (TVSS)

[76] Inventor: Edward F. Allina, 605 Capri Blvd., Treasure Island, Fla. 33706

[21] Appl. No.: 14,377

[22] Filed: Feb. 5, 1993

Related U.S. Application Data

[63] Continuation of Ser. No. 532,397, Jun. 1, 1990, which is a continuation-in-part of Ser. No. 923,524, Oct. 28, 1986, Pat. No. 4,931,895.

[51] Int. Cl.$^6$ ..................................................... H02H 9/00
[52] U.S. Cl. .............................. 361/56; 361/111; 361/118
[58] Field of Search .............................. 361/364, 56, 117, 361/118, 111

[56] References Cited

U.S. PATENT DOCUMENTS

| | | | |
|---|---|---|---|
| 2,606,232 | 8/1952 | St. John | 361/364 |
| 3,914,657 | 10/1975 | Melanson | 361/127 |
| 4,089,032 | 5/1978 | Dell Orfano | 361/56 |

Primary Examiner—Jeffrey A. Gaffin
Assistant Examiner—Stephen W. Jackson
Attorney, Agent, or Firm—Charles A. McClure

[57] ABSTRACT

Transient voltage surge suppression (TVSS) located conveniently between the conventional plug-in watt-hour meter and its socket at a customer's location. Over-voltage means, such as one or preferably more metal oxide varistors, are supported there, as in a cylindrical housing called a meter adapter. The varistors connect electrically between power leads and an external ground lead to clip voltage transients and to shunt resulting surge currents harmlessly to ground. Varistors may be inserted into suitable holders therein or may be prepackaged and be retained therein within such prepackaging. One terminal and preferably a face of each varistor is contiguous with an extensive laminar conductor within the adapter in the pathway to ground so as to accommodate extremely surge currents and to aid in dissipating resulting accumulation of thermal energy.

3 Claims, 5 Drawing Sheets

PRIOR ART

TRANSIENT VOLTAGE SURGE SUPPRESSION (TVSS)

This is a continuation of my application, Ser. No. 532, 397 filed 1 Jun. 1990, which was a continuation-in-part of application Ser. No. 923,524 filed 28 Oct. 1986, now U.S. Pat. No. 4,931,895.

TECHNICAL FIELD

This invention relates to transient voltage surge suppression (TVSS) as in a cylindrical housing called a "meter adapter" located in plug-and-jack manner between a conventional watt-hour meter and a socket into which the meter's electrical contactor blades ordinarily plug, located usually in an externally grounded utility box or panel mounted on an exterior wall.

BACKGROUND OF THE INVENTION

Electrical power supplied by public or private utilities is susceptible to transient voltage variations attributable to lightning strikes and/or switching malfunctions. Customers traditionally have borne the brunt of transient surges, and had their light bulbs and motor windings fail ("burn out") from time to time as a result. However, that is no longer acceptable in an age of solid-state electronic devices, which often may be damaged worse by smaller surges than their appliance motors or radios withstood in the past. The desirability of protecting utility meters and downstream electrical equipment from voltage surges is obvious, and customers expect to receive such protection. Indeed, regulatory agencies and the courts are imposing upon public utilities an obligation to assure suitability of product/service as delivered rather than resorting to a force majeure or "act of God" concept to excuse preventable damage to a customer's equipment or installation.

Accordingly, electrical utilities are now having to exercise more quality control over their product/service, to render it truly merchantable for modern-day uses—or be potentially liable, in the event of surge damage, for not doing so. As in other instances of readily available safety measures, insurance companies are able to foster adoption of transient voltage surge suppression, by providing more favorable rates where TVSS has been installed.

Conventional watt-hour meters are commonly connected between an external power source and electrical equipment downstream, so as to measure the amount of electrical energy or power utilized by the downstream equipment. Such meters have as contactors protruding bladelike terminals that plug into a socket connected to power-line leads at a utility box or panel, as at a power customer's location. As suggested by the present inventor in 1986, in the earliest of his aforementioned patent applications, the vicinity of the watt-hour meter is his preferred site for transient voltage surge suppression.

For many decades electrical utility personnel have known that switches and other circuit-interruption devices can be installed in a cylindrical housing, now known as a meter adapter, for plug-and-jack interposition between a watt-hour meter and its socket, as was pointed out in the present inventor's earliest patent application by reference to patents granted to St. John and Megarian, for example.

St. John in U.S. Pat. No. 2,606,232 (1952) disclosed interposable adapter means providing for circuit-interruption, by manual switch at will, and by circuit breaker and/or fuse in the event of current overload of such amount and duration as to provoke an interruption. St. John's objectives were to free authorized personnel from having to enter the premises serviced by the power lines in order to shut off the power and/or to replace fuses or service circuit breakers. St. John's arrangement left the meter connected to the power lines despite interruption of the downstream circuit for any reason, so it did not protect the meter itself against transients on power lines.

Megarian in U.S. Pat. No. 3,599,047 (1971) elaborated upon manual switching, including disconnecting the watt-hour meter from the line power when the downstream circuit was not to be enabled. When the line power was shut off, Megarian's arrangement protected the meter as well as the downstream electrical equipment—but both the meter and the downstream equipment remained susceptible to damage from a transient voltage surge received via the power lines when connected.

Neither St. John's nor Megarian's arrangement provided any TVSS protection, not only because obviously manual switches cannot do so, but also because over-current devices, such as fuses or circuit breakers, even when connected, are not actuated by fractional-second transient surges but only by current overloads of appreciably longer duration—and after actuation must be replaced or reset. As already noted, even St. John's fuses and circuit breakers were not connected in the circuit to the watt-hour meter so could not even protect it against a protracted current overload sufficient to actuate a fuse or a circuit breaker.

Protection against over-voltage, as distinct from protection against over-current conditions (such as a current overload), calls for completely different electrical means. The archetype of such means is a spark gap. Spark gaps have been used for years on power lines, but open-air spark gaps are erratic in their action and are unsafe for use at a customer's premises, whereas analogous gaps in gas-filled envelopes lack adequate response time to cope with the transient surges received from power lines.

A watt-hour meter has a predictably long life, even a quarter century if protected against excessive voltages and currents. Some workers in the art undertook to provide such meters with protection against damaging voltage transients as well as current overloads.

A spark gap undergoes no electrical conduction until a large enough voltage differential builds up across its terminals between power line and ground to cause an arc between them, whereupon the spark gap clips the voltage transient and conducts the resulting surge current to the external ground. The required voltage differential is a function of gap size, terminal shape, intervening gas(es), gas pressure, and humidity. The voltage drop across a conducting arc is much smaller than the voltage required to initiate or "strike" such arc. Once struck, an arc may become self-sustaining or at least difficult to extinguish, as current "follows on" through the resulting low-impedance gap filled with already ionized air. A standard remedy was insertion of a high-resistance, in series with the spark gap, as via a Nichrome wire. At the low voltage present at watt-hour locations, a high series resistance tended to prevent the spark gap from striking so as to clip intermediate-level voltage surges hazardous to meters and to shunt resulting current to ground.

Workers in the art attacked this problem by substituting a variable-resistance means for the fixed-resistance Nichrome wire in series with the spark gap. Zisa in U.S. Pat. No. 3,725,745 (1973), and Melanson in U.S. Pat. No. 3,914,657 (1975), connected solid-state variable-resistance devices between power lines and the spark gaps. The function of such a device (characterized by inverse relationship between its resistance and applied voltage) was to conduct readily whenever the voltage surged so high that the spark gap would conduct but to discontinue conducting at the lower follow-on voltage so as to extinguish the arc promptly upon cessation of the voltage surge. Although similar arrangements were adopted for power lines at higher voltages, they were not adopted at the usual watt-hour locations.

Other workers, such as Dell Orfano in U.S. Pat. No. 4,089,032 (1978), adopted "varistors" (a class of such solid-state devices) for over-voltage protective apparatus adapted to be plugged into electrical wall outlets upstream of whatever is to be operated by electricity drawn from such outlets. Such protective apparatus may contain additional components, such as glow tubes or diodes, but at least in the absence of such added components, the varistors operate to clip voltage surges at a given level above normal power voltage and shunt their surge currents away (usually to ground) before reaching the downstream equipment. In this regard a varistor selected to conduct minimally at normal power voltage has taken on the primary function (formerly performed by a spark gap) of clipping the surge above a preselected higher voltage, and a modified function of minimal conduction (substantial non-conduction) at power voltages.

Despite (or perhaps because of) the diversity of teachings in such patents, and notwithstanding the two decades between St. John's meter adapter and the aforementioned 1970's patents, no one then or in the decade of the 1980's provided a meter adapter with built-in TVSS until the present inventor first did so in the mid-1980's.

Despite the well recognized need for transient voltage surge protection, the resulting meter-based TVSS revolution, now under way was impossible to foresee. For whatever reasons, the art was stagnant, and the contributions of inventors noted above had not given rise to the present methods or apparatus. Once the present inventor had shown the way, entry into the field occurred so rapidly as to underscore the unlikelihood that the prior art would have provided such contributions to this surge-suppression art unaided.

The steps of installing a TVSS meter adapter could hardly be much simpler. The installer first unplugs the watt-hour meter from its socket in the customary utility box or panel, then plugs the adapter (in place of the meter) into the socket, and finally plugs the meter into the meter adapter as the meter had been previously plugged into the socket. Installation requires only a few minutes.

Producing an effective TVSS meter adapter is quite difficult because of the extreme conditions imposed upon the apparatus by the transient surges. In view of the very high, but quite short, voltage surges and the very large resulting surge currents, testing sites for apparatus of this general type have been severely limited (and testing costly) so that in most instances it is impracticable for users to test competing equipment or to verify (or disprove) operating specifications or technical claims of suppliers. The present inventor constructed a lightning simulation laboratory, with computerized documentation of the duration and height of voltage surges to thousands of volts and the intensity of surge currents to tens of thousands of amperes.

Competing manufacturers, whether they have or have not actually tested their products under surge voltages and resulting currents, overwhelmingly have adopted the meter adapter as the preferred means of housing varistors connected to provide TVSS at the watt-hour meter location. Competitors also have included, with noteworthy alacrity, various improvements—whether patented or not—provided by the present inventor, who has pioneered increased surge capacity and safety of surge-protective apparatus.

Examples of his inventions include ground-plane heat-sinking of component varistors (see his aforementioned patent); inserting temperature-responsive or "thermal" fuses or like cutoff devices to sense temperature and to disconnect the varistors from the power lines to preclude failure from excessive temperature rise (as in U.S. Pat. No. 4,866,560); stacking varistor disks in parallel circuit (in U.S. Pat. Nos. 4,901,187, 5,006,950, and 5,148,345); and improved plug-and-jack connectors (as in U.S. Pat. Nos. 4,944,692 and 5,129,841). Other examples of his TVSS contributions have focused upon a hard-wired unit, including distributed-resistance fuse links, with or without thermal cutoff means and/or varistor stacking, between power line leads and varistors (as in U.S. Pat. Nos. 4,907,119 and 5,148,345); and arc extinguishing (as in U.S. Pat. No. 5,140,491).

The present application is directed to the work product of his early insights, especially as embodied in a meter adapter. His article "Facility Surge Protection" in the initial (1990) issue of POWER QUALITY Magazine (p. 47) notes their technical superiority, as do third-party papers, including (i) Power Quality Association PQA-91 Report B-22- *Residential Transient Voltage Surge Suppression Program*, by A. Michael Maher of Potomac Electric Power Company (Pepco), Washington, D.C., detailing demand for and utility of TVSS meter adapters, along with results of comparative testing of several brands of such adapters (Brand D is the present inventor's adapter, the unit with the largest diameter varistors—thus avoiding any need for dubious parallel interconnection of smaller varistors as in other competitors' units); (ii) *Residential Service Entrance Surge Suppression Device Testing & Considerations* by Raymond C. Hill of Georgia Power Company, which details its own testing rationale and program and has an extensive autobiography (the unit finally selected at page 11, ¶3 was the present inventor's); and (iii) March 1992 CEE News article "Power Quality Pays Off" by J. David Lankutis, about the success of the present inventor's meter adapters installed by San Miguel Power Association in coping with a given surge event.

SUMMARY OF THE INVENTION

A primary object of the present invention is to enable meters of conventional electromechanical or all-electronic watt-hour type to be protected from transient surge damage without modification of such a meter or of its conventional socket at a customer's location.

Another object of this invention is to localize the suppression of transient voltage surges between such a meter and its socket.

A further object of the invention is to simplify installation and removal of transient voltage suppression in the vicinity of the conventional watt-hour meter without altering the meter itself.

Yet another object of this invention is to provide an adapter for such a meter with means supporting surge-suppression apparatus.

A still further object of the invention is to use either unpackaged or prepackaged varistors or the like in providing transient voltage surge suppression and accomplishing the foregoing objects.

Another object is improve the grounding of TVSS circuitry.

A further object is to provide such surge-suppression apparatus and methods, for so protecting such meters and downstream equipment, more economically than could be accomplished with the prior art.

A still further object is to attain the foregoing objects and the necessary grounding not only effectively but also economically.

In general, the objects of the present invention are attained, in providing transient voltage surge suppression, to protect a power source's plug-in watt-hour meter or downstream electrical equipment, between the watt-hour meter and a socket into which contactor blades protruding from the meter housing ordinarily plug.

More particularly, the objects of this invention are realized in varistors as active TVSS circuitry interposed between a watt-hour meter and its conventional base in a utility box or panel having a socket to receive (and normally covered by) the meter, by means of an added plug-and-jack adapter into which the meter plugs and which itself not only plugs into such socket but also supports such TVSS circuitry and fits closely over and covers an opening in the box or panel—usually covered by the meter.

Other objects of the present invention, together with means and methods for attaining the various objects, will be apparent from the following description and the accompanying diagrams of preferred embodiments, being presented by way of example rather than limitation.

DETAILED DESCRIPTION

Figure 1A:
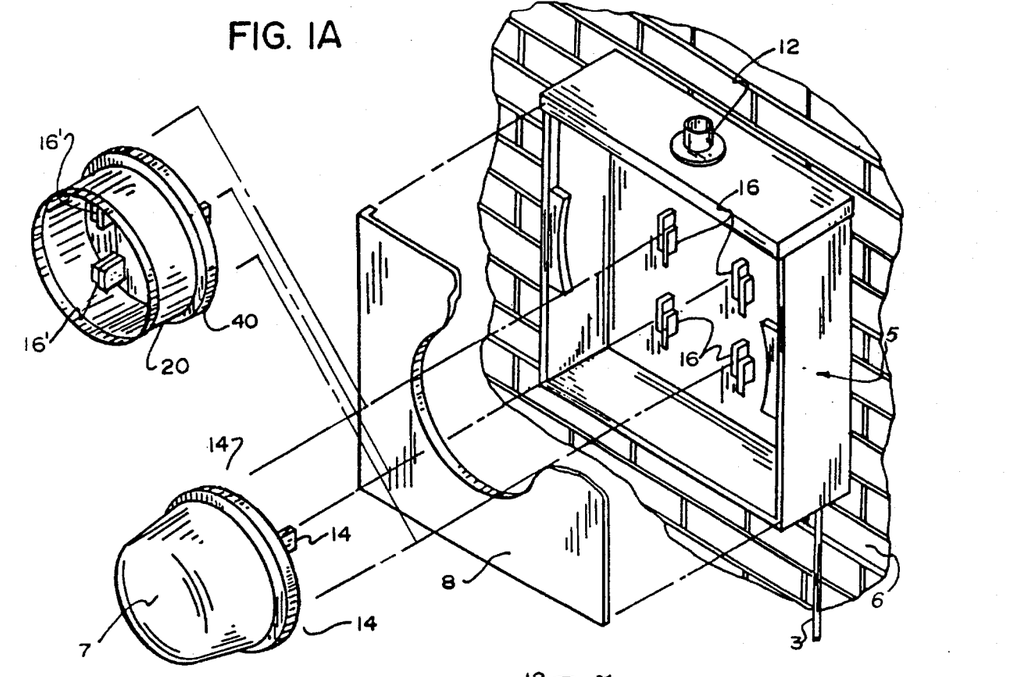
FIG. 1A is an exploded perspective view of surge-protection adapter means of the present invention in normal use, between watt-hour meter and the usual meter-receiving socket in a utility box.

FIG. 1A shows, in exploded perspective, generally rectangular electrical utility box or panel 5 mounted on wall 6. Grounding cable or rod 3 extends downward, whereas conduit 12 extends upward therefrom to receive incoming power lines (not shown). The conventional interconnections inside the box or panel are omitted except for jaws 16, which constitute a socket for blades 14 of watt-hour meter 7. The meter has a dome-like transparent cover (contents hidden) and is shown displaced along straight (broken) lines from the box or panel 5 past its cover or door 8. Offset to one side from the axis is a similarly oriented meter adapter of this invention, as cylindrical housing 20 with cover 40, shown assembled together as a unit here.

It will be understood that the FIG. 1 diagrammatic arrangement shows how the watt-hour meter, which may be wholly conventional, is customarily assembled to its socket (plugged straight in) and also shows how the meter adapter of this invention (shown offset) is interposed between meter and socket so that the meter may be plugged into the adapter and the adapter be plugged into the socket.

Figure 1B:
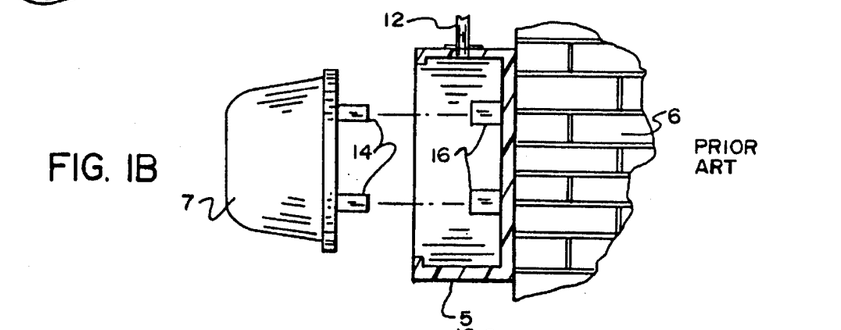
FIG. 1B is an exploded side elevation of one form of FIG. 1A.

FIG. 1B shows, in exploded side elevation, meter 7 positioned with its blades or spade terminals 14 to be plugged into the socket formed by jaws 16 in box or panel 5, as customary in the prior art.

Figure 1C:
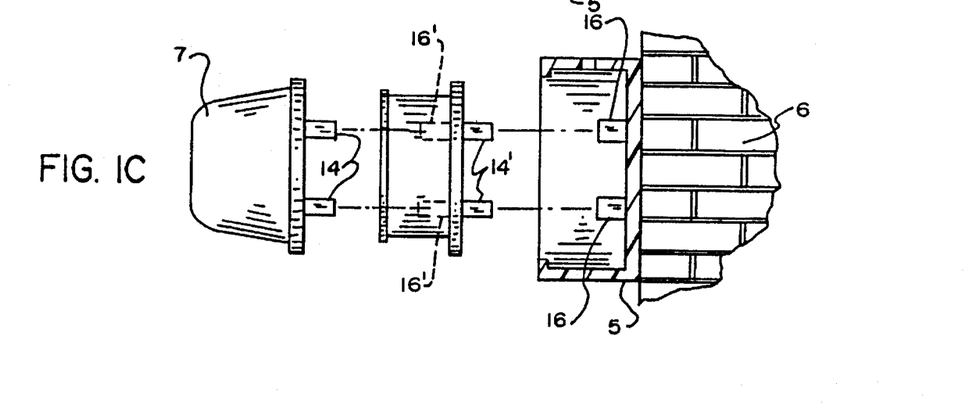
FIG. 1C is a like side elevation of another form of FIG. 1A.

FIG. 1C shows, in exploded side elevation similar to FIG. 1B, the meter adapter (20 plus 40) positioned with its blades or spade terminals 14' protruding in position to be plugged into the socket formed by jaws 16 in box or panel 5. Cylindrical wall 22 of the adapter encloses jaws 16' (similar to panel jaws 16) as another socket to receive blades or spade terminals 14 of the meter itself. A split ring (not shown) fits about respective component end flanges to retain the assembled abutting components together. Such retainer rings are flexible, and some have a slotted part through which a laminar part protrudes when the ring is in its place. An opening through the protruding laminar part accepts a wire that is then surrounded by a lead seal or similar means to discourage, or to reveal, unauthorized disconnection or tampering with the assembly.

Figures 2, 3, 4:
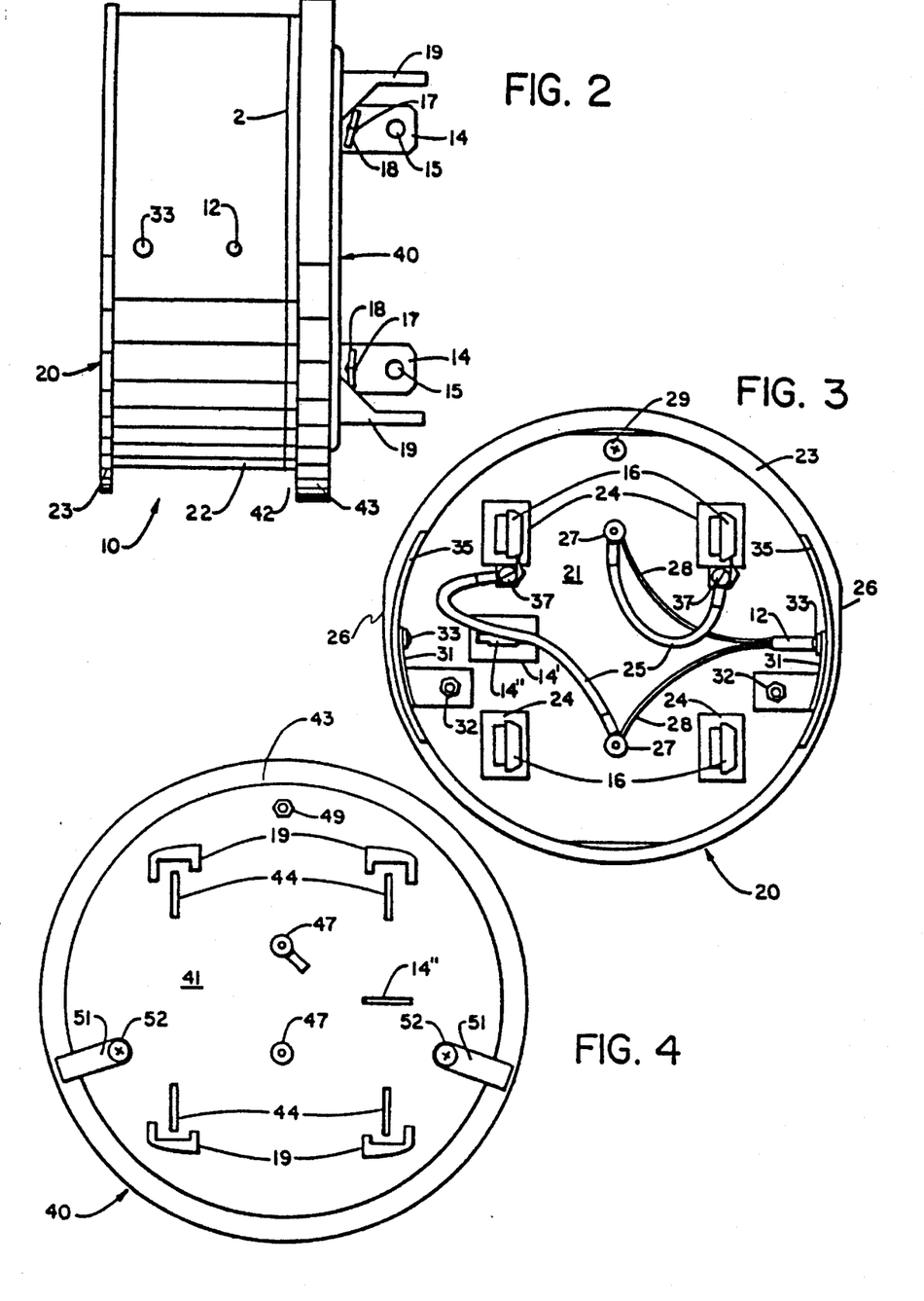
FIG. 2 is a right side elevation of the adapter means partially visible in FIG. 1, disassembled from other apparatus shown there.
FIG. 3 is a front (meter) elevation of the same adapter means.
FIG. 4 is a rear (socket) elevation of the same adapter means.

FIG. 2 shows, in right side elevation, a meter adapter of this invention disassembled from the utility meter and box of FIG. 1 and on an enlarged scale. The adapter comprises two principal members (joined together here along vertical junction line 2): open-ended cylindrical housing 20 open at the left, and shallower cover plate 40 at the right. The housing member has sidewall 22, surrounded at its open (left) end by flange 23. Visible in the housing, just left of the separation line and midway from top to bottom, is condition light 12 connected (as shown later) to indicate an operative or ready condition when lit and an unready or out-of-order condition when not lit. Further left is fastener 33, discussed further below.

Protruding to the right of the cover plate are plug terminals 14 of spade type (two of four are visible), each with opening 15 near its free end and with smaller opening 17 nearer the plate and with retaining cotter pin 18 therethrough. Above and below (partly surrounding and partly hidden beyond) the spade terminals are feet 19, one visible per connector, protruding a bit farther than the terminals. It will be apparent from later views that there are two pairs of such terminals; conventionally the upper pair are for power input to the meter, and the lower pair for power out to a customer's installation and electrically powered equipment downstream.

FIG. 3 shows, in front elevation, the open end of housing member 20 of adapter means 10, which has base 21 closing one end of cylindrical sidewall 22. Generally circular edge flange 23 at the open end has a pair of flat portions 26 at its opposite sides. Four rectangular bosses 24 rise from the base of the housing, in a nearly square layout, each with one of the previously shown spade terminals inserted into and through a close-fitting vertical slot (not numbered). Jaws 16 of the jack end of such terminals protrude toward the viewer from the tops of the bosses.

Fifth boss 24'—similar to the others in FIG. 3 but oriented with slot 24" therein horizontal instead of vertical—is available for future use, not being required or used by the present invention.

Figures 8, 9, 10, 11:
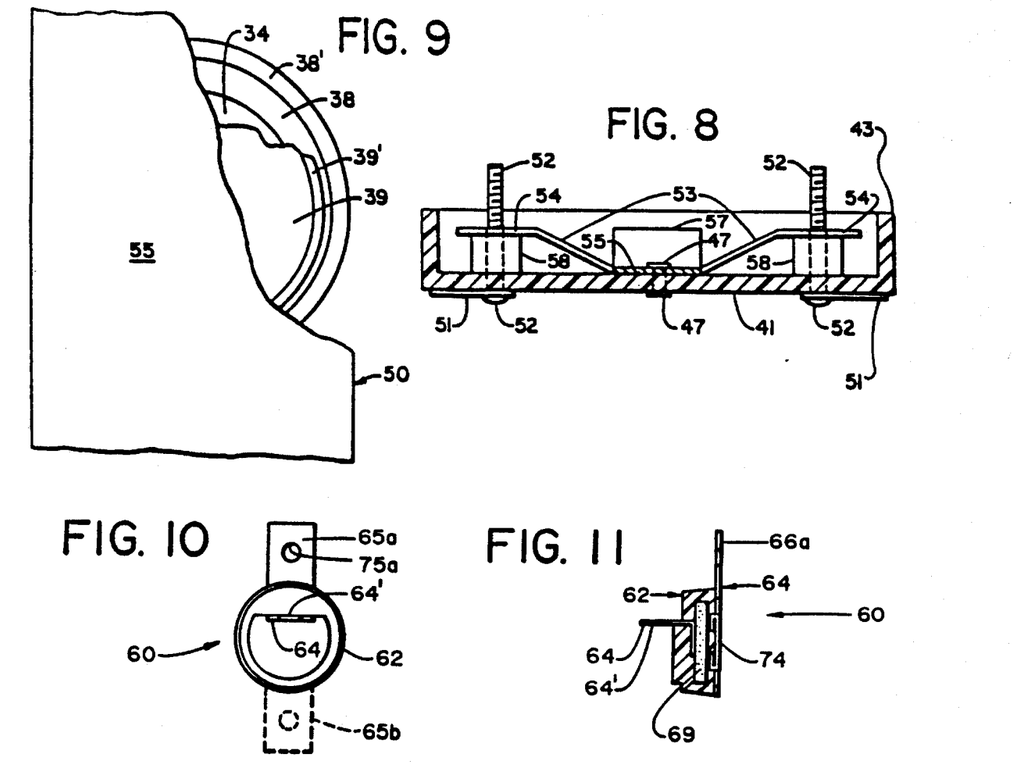
FIG. 8 is a horizontal section through such adapter cover plate, taken at VIII—VIII on FIG. 7.
FIG. 9 is a successively cut-away layered detail view of a portion of such apparatus including a cuplike holder.
FIGS. 10 and 11 are, respectively, a front elevation and a side sectional elevation of prepackaged varistor means useful according to this invention in modified meter adapter means.

Fasteners shown in FIG. 3 and subsequent views are illustrative rather than limitative. Usually (but not always) the same reference numeral denotes all parts of any given fastener, whether alike or different, as at opposite ends. Pair of fuse links 25 connect between pair of fasteners 37 at the top pair of terminals to pair of fasteners 27 located laterally midway between the top and bottom pairs of bosses, respectively. Condition light 12 (partly hidden in a right sidewall opening) has pair 28 of leads also extending to fasteners 27. Shown between the light and the viewer is one of pair of ground straps 31, secured to fasteners 32 (one each) in the base and also to fasteners 33 (one each) in the sidewall of the housing. The respective straps are attached by the last mentioned fasteners to grounding collars 35, extending along minor lengths of the edge of the housing sidewall. Located above upper fastener 27 is fastener 29 to aid in retaining cover plate 42 on the housing base and to connect to ground via grounding strips 51 and fasteners 52 (FIG. 8).

FIG. 4 shows adapter means 20 in rear elevation, notably cover plate 42 and specifically the outside face of its plate 41 and edge of its surrounding flange 43. Shown symmetrically arranged in the same pattern as jaws of the terminals in FIG. 3 are spade ends 14 thereof. Partly surrounding the outer edges of the terminals are feet 19, here seen end-on. On the vertical midline (not marked) are pair of fasteners 47, 47' located a short distance below and above the horizontal midline (also not marked). Auxiliary pigtail ground connector 42 is part of the upper fastener.

Located the top edge in FIG. 4 is opposite end 49 of fastener 29 extending from the housing base (see FIG. 3). Slanting downward at both the right and left sides in FIG. 4, from the ends of screw fasteners 52 (one each) in the plate near the edge of the flange, are pair of grounding strips 51 partly overlying that edge, and adapted to contact the conductive rim of the grounded box or panel when the adapter housing is in place thereagainst covering it to the extent a meter normally does. These strips are interconnected via the screw fasteners to ground plane 50 on the interior of the cap. It will be understood that the ground connection is carried over in conventional fashion via grounded box or panel 5 to grounding rod 6 extending downward therefrom.

Figure 5:
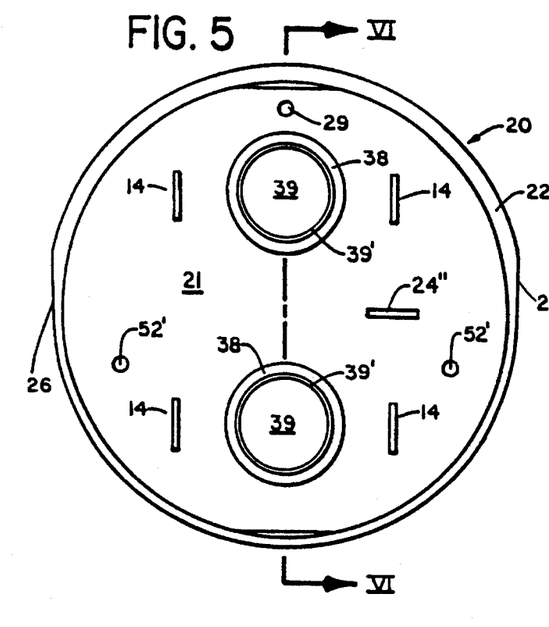
FIG. 5 is a rear elevation of a housing adapter portion of the same means, shown disassembled from a cover plate portion thereof.

FIG. 5 shows, in rear elevation, housing base 21 of adapter means 10, whose front elevation appeared in FIG. 3. Upper and lower bores 29 appear as before. Spade terminals 14 protrude toward the viewer through corresponding slots (not visible) in the rectangular array shown previously. Unused horizontal slot 24" also appears, being provided to accommodate another terminal set not used here. Midway between the respective upper and lower pairs of terminals are pair of shallow cup-shaped non-conductive holders 38 for disk-shaped (two-faced) varistors 39, each with non-conductive collar 39' and spaced laterally apart by a distance at least one varistor diameter. Right and left flats 26 on housing flange 23 appear as before. A vertical section line is superimposed to indicate the next view.

Figure 6:
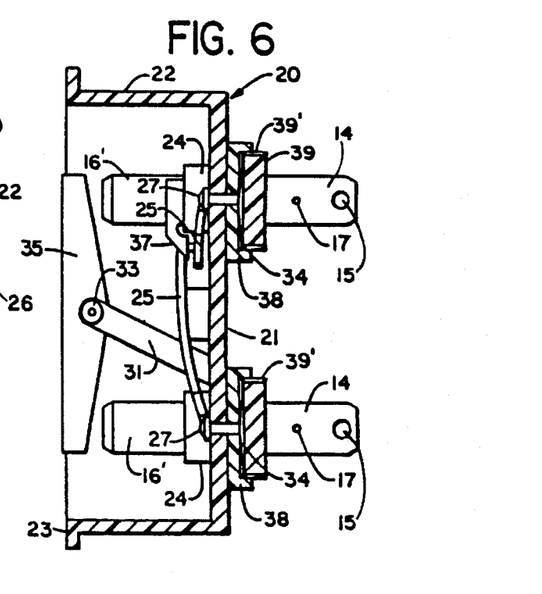
FIG. 6 is a vertical section through such adapter housing, taken at VI—VI on FIG. 5.

FIG. 6 shows a vertical section through the housing member of the adapter means, at VI—VI on FIG. 5, corresponding to a leftward looking vertical section of the housing member of the adapter shown from the front in FIG. 3. Partial collar 35 is seen, in more detail than previously, along part of the edge of flange 23 and sidewall 22 and connected by fastener 33 to grounding strap 31, which terminates along the housing base as shown further in FIG. 3.

One fuse link 25 is connected between fastener 37 at the upper terminal to fastener 27 located nearer the viewer than the lower terminal and surrounding boss. The other fuse link is shown (fragmentarily) connected to the corresponding fastener ahead of the upper terminal boss. The other end of each such fastener is suitably attached to one of a pair of conductive lamina 34, circular in outline, contiguous with one face of one of varistors 39, each in adjacent cup-shaped holder 38. The laminar cross-section shows a recessed central part, surrounding the head of the fastener, and a flatter annular part therearound and in actual contact with the conductive varistor face. Of course, the varistors and holders are nearer the viewer than spade terminals 14 shown extending to the right from locations behind them. Contactors (one each) for the opposite face of each varistor are carried by the cover member, as shown in the next pair of views.

Figure 7:
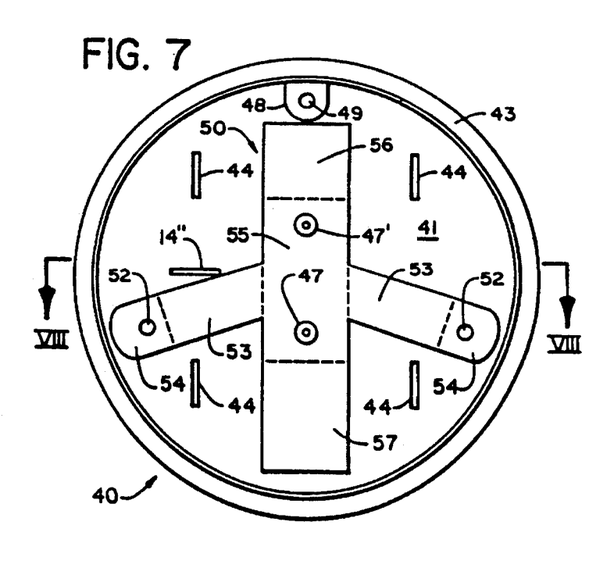
FIG. 7 is a front elevation of the cover plate member of such adapter means (apart from the housing base), whose rear elevation was shown in FIG. 4, featuring a ground plane member.

FIG. 7 shows, in front elevation, cover plate 40, whose rear elevation was shown in FIG. 4. Bore 49 near the top center, just below the inner edge of flange 43, is surrounded by boss 48. Slots 44 for spade terminals 14 (not present in this view) are visible as before. The most prominent feature here is electrically conductive laminar cruciform ground plane member 50, with wide body portion extending from just below boss 48 to near the bottom inside edge of flange 43, and narrower arm portions extending therefrom. Central rectangular part 55 of the body portion adjoins upper and lower body parts 56 and 57, each of which rises toward the viewer and is sufficiently springy to provide excellent electrical contact with substantially the entire face of each of the underlying varistors when the cover plate is assembled to the adapter housing base. Pair of integrally formed arms extend outward and slant downward from the opposite sides of the central part of the body member. Each arm has terminal part 54, overlying boss 58 and secured by screw fastener 52 through an opening therein, interconnected to the body by inclined intermediate part 53 (separately designated here because of planar differences visible in the next view). The surface area of this ground plane member (both sides) is at least about one-third of the housing transverse cross-sectional area. It functions not only as a multi-connected grounding conductor but also as a heat sink, noted below.

FIG. 8 shows cover plate 40 sectioned horizontally and viewed downward, as indicated at VIII—VIII in FIG. 7.

Bosses 58 (through which screw fasteners 52 pass) underlie respective end portions 54 of cruciform member 50, raising them out of the plane of the central part of body portion 55 thereof, which is secured against the inner face of the cover plate by a pair of fasteners (see FIG. 4). Outer end of only the lower one of such conducting ends can be seen here. Intermediate portions 53 of the arms slant upward from junction with the body to junction with respective end portions 54 of member 50. Lower part 57 of the body portion of the cruciform member shown in FIG. 7 is visible rising from the plane of that part so secured.

FIG. 9 shows, on an enlarged scale and successively cut away, a portion of the apparatus of this invention shown in somewhat less detail in prior views. Shown closest to the viewer is part of the body portion of electrically conductive ground plane member 50, cut away to show some underlying components, including next underneath and in contact with it a face of varistor 39, with insulating collar 39'. Circumferentially surrounding the varistor is upturned edge 38' of non-conductive cuplike holder 38, which does not reach overlying conductive member 50. The varistor and its surrounding collar are cut away to reveal conductive lamina 34, which is in contact with the underlying opposite face of the varistor, and incidentally to show more of the base of the cuplike holder as well.

This FIG. 9 view is included because of operational importance of the electrical circuitry represented by the visible components, whose functioning is considered in some detail below, where it is noted that member 50 is not only an excellent conductor of electricity but also of heat.

Figure 12:
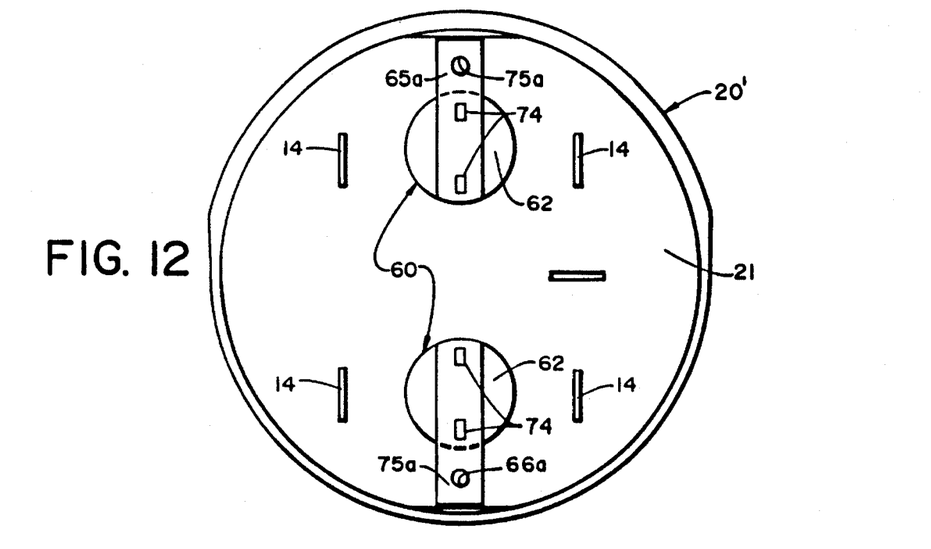
FIG. 12 is a rear elevation of a meter adapter housing much as in FIG. 5 but modified to accept a pair of prepackaged varistor means of FIGS. 10 and 11.
Figures 13, 14, 15:
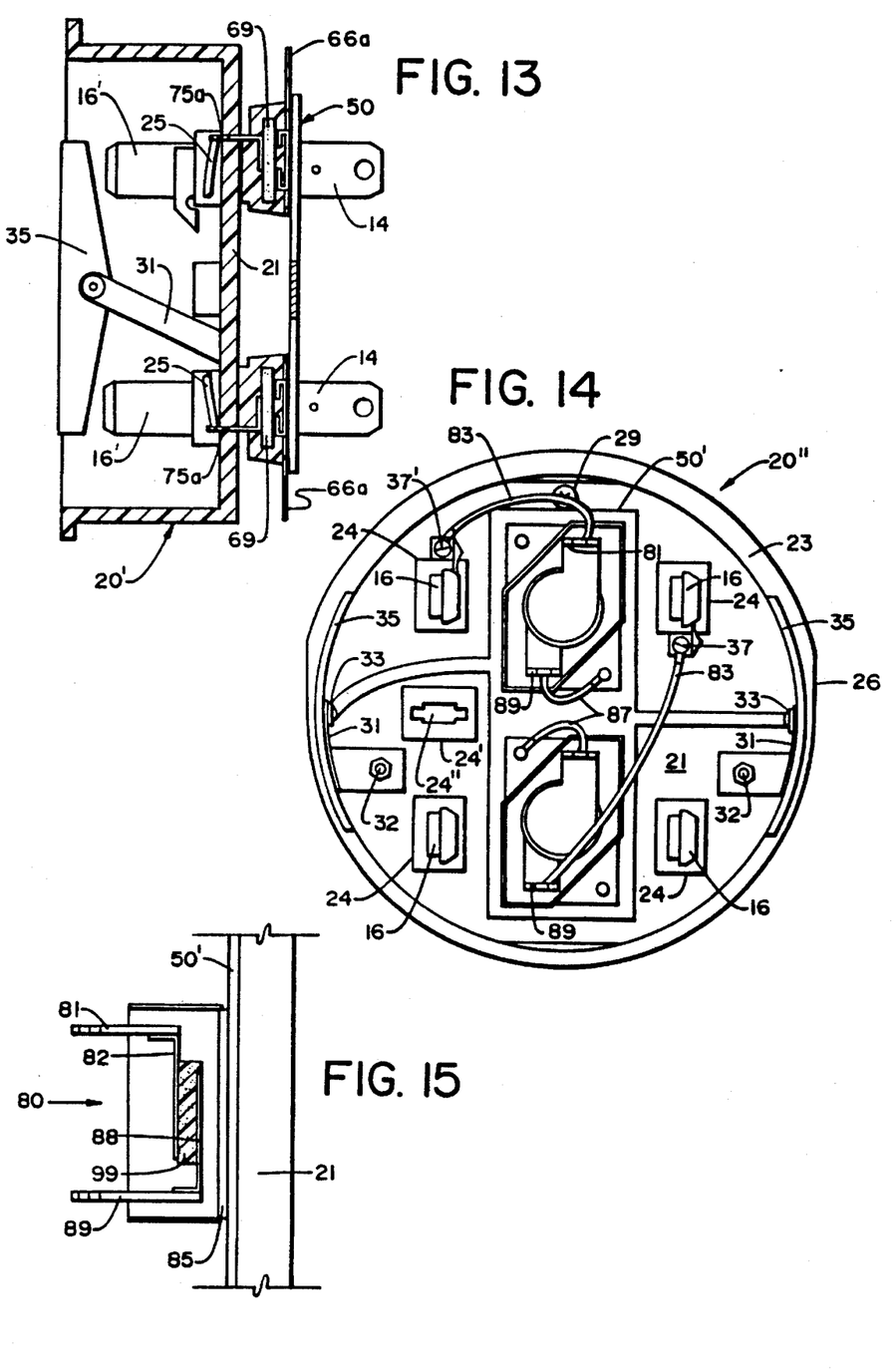
FIG. 13 is a side sectional elevation of the apparatus of FIG. 12 plus a ground plane member modified from that of FIG. 7.
FIG. 14 is a front elevation of a similar meter adapter housing modified to accommodate other prepackaged varistors.
FIG. 15 is a side elevation of a varistor package from FIG. 14, partly in section.

FIGS. 10 through 13 illustrate a modified embodiment of the invention in which prepackaged varistor apparatus replaces the open-face varistors and related holding means already shown. In this embodiment, apparatus components identical to those in the first embodiment are designated by the same reference numerals as before. Modified components not otherwise designated are either primed or are given reference numerals increased by thirty (30) over predecessor numerals. Reference numeral 60 designates the prepackaged varistor apparatus, and FIGS. 12 and 13 show more particularly a pair thereof (located similarly to unpackaged varistor means 39), as in single-phase electrical service.

FIG. 10 shows varistor apparatus 60 from the front, featuring the face of non-conductive cylindrical housing 62 from which strip terminal 64 (with opening 64' therein) extends forward. Tabs 66a and 66b (of rear terminal 66) extend above and below the housing, with mounting openings 75a and 75b therein. Lower tab (65b) appears in broken lines, as not necessary and removed for this application.

FIG. 11 shows varistor apparatus of FIG. 10 in vertical side section. Visible inside is varistor disk 69, with the inner base of front terminal 64 (which is L-shaped) extending along and in contact with part of the adjacent face of the varistor disk. At the rear (right in this view) C-clip 74 through rear terminal 66 terminates in a pair of contacts with the back of the varistor.

FIG. 12 shows adapter housing member 20' with pair of such items of prepackaged varistor apparatus 60 mounted therein. FIG. 13 shows the same housing member from the side, sectioned along with the varistor apparatus. Terminal 64' extends through base 21 of the housing member (via an undesignated opening) enough to receive the wire of positive lead 25 into opening 75a in tab 65a.

FIG. 13 shows, in vertical section, same housing member 20' with prepackaged varistor apparatus assembled to it as in FIG. 12. Also indicated here in broken lines is member 50—from FIG. 7—to illustrate the sandwiching of the varistors between terminals from the hot side to the ground side of the surge circuit. Cover member 40 (not shown here) carries conductive member 50 in surface contact with substantially all of the contiguous face of terminal 64'.

FIGS. 14 and 15 show from the front and side another apparatus embodiment of this invention with pair of prepackaged varistor means 80 in a different arrangement from that shown in FIGS. 12 and 13. Here the open end of the adapter housing (redesignated 20") is provided with modified laminar cruciform conductive member 50' flat on the inside surface of the housing base. Each varistor package 80 is mounted with substantially all of its external conductive member 85 (insulated electrically) against member 50. Each varistor has one face 82 connected from its protruding terminal 81 via lead 83 to one of jaws 16 in the top half of the adapter housing (power input), whereas other face 88 is connected by lead 87 from its protruding terminal 89 to member 50 and thereby grounded.

Operation of the apparatus of this invention will be readily understood. In the event of an electrical transient that exceeds the usual power voltage sufficiently to pose an electrical equipment hazard, i.e., a "surge" it appears across the power input terminals (the top pair) and is conducted by the fuse links to the varistors, which are preselected for their ability to conduct readily starting at a voltage appropriately higher than the power line voltage. In a very short time, varistor conduction occurs and bleeds the surge harmlessly off to ground via the intervening conductive elements. It will be understood that a path is provided to the grounding rod or cable via cooperating conductors (not shown) with which connection is made upon assembling the adapter means to the electrical utility box—into whose socket the meter usually is plugged, in the absence of the adapter means of this invention.

Current flow in a lightning-induced surge, even for only a few microseconds to a millisecond or so, may result in a current density of hundreds or even thousands of amperes per square centimeter. Despite the low resistance of the path followed within the adapter, the resulting heat to be dissipated may be appreciable.

Ground plane member 50 functions not only to provide considerable current-carrying capacity as needed but also an auxiliary heat sink and thereby tends to preclude possible flashover, shorting, or other damage to the varistors. This enables the adapter—and the meter protected by it—to withstand repeated lightning surges or similar intermittent disturbances without any failure or damage to the varistors or other parts.

The heat sink conveniently is made up of a metal having high electrical conductivity, thermal conductivity, and heat capacity. Copper is preferred, but aluminum (which will occupy several times as much space as an equivalent mass of copper) is also suitable. A couple grams of either will take up several joules (about a dozen calories) of heat energy for each degree of rise in temperature. If the higher cost is acceptable, silver—not to mention gold—is an excellent choice. A thickness of about a millimeter or so extending over much of the cross-sectional area of the adapter housing enables the varistors and the meter protected thereby to withstand repeated lightning surges or like disturbances without resulting damage.

Surge-generated heat collected in large part by the heat sink is subsequently conveyed away-usually mostly by conduction, partly by convection, and even less by radiation—to the environment. A multiplicity of such surges can be accommodated while increasing the temperature of a suitable heat sink only relatively few degrees, whereas collection of the equivalent amount of heat energy by the varistors or by sensitive meter parts risks adverse effects upon them or their functioning.

In the event of a more sustained surge, as from some fault in power generation or transmission, resultant melting of one of the fuse links soon disconnects the power from the indicator light, a gas-filled (e.g., neon) glow lamp or a light-emitting diode, for example. Observation that the light is out (unlit) prompts inspection and temporary replacement of the unit for inspection and testing, to be followed by whatever maintenance may prove necessary.

The varistors themselves comprise sintered metal compositions, mainly metal oxides, such as zinc oxide, or (formerly) silicon carbide, and optionally lesser amounts of other contributing materials. Varistors are quite rugged and can stand a good deal of electrical abuse. They are articles of commerce and can be obtained in a wide range of voltage and current capacities through electrical equipment manufacturers or dealers, whether unpackaged or prepackaged.

The prepackaged varistors of the second embodiment are readily available from Harris (earlier G.E.) under the designation of Models HE and PA base mounts, being metal oxide varistors provided with metal terminals to the exterior and otherwise encapsulated in durable non-conductive solid resin. Similarly prepackaged varistors may be obtained from Panasonic, Siemens, or other manufacturer.

In general, unpackaged varistors, not being hard-wired into the circuitry, have the advantage of being more readily replaceable, as may be advisable from time to time or in the event of failure from current overload—perhaps while protecting downstream equipment.

The other components of the adapter apparatus of this invention are also readily available in ordinary trade channels. The housing and cover members may be adapted from standard articles or may be redesigned specifically for this purpose. They are composed of common non-conductive plastic materials, with or without reinforcing additives. Glass-fiber reinforced polyester and ABS are examples of the many suitable compositions available.

Advantages of using the surge-protective adapter apparatus of this invention have been mentioned above, and others will be readily apparent. A watt-hour meter already in use can be protected simply by unplugging it and plugging the adapter in its place, and then plugging the meter into the adapter. Existing meter designs do not have to be redesigned at considerable expense and possible delay in availability to incorporate varistors or equivalent protective means because the adapter renders such redesign unnecessary.

Electrical power customers benefit because the protection also protects their appliances, computers, radio or television receivers, and other sensitive loads from the same surges. Such protection is as worthwhile for their equipment as it is for the power company's meters. Providing such protection will benefit the power company indirectly as well as directly.

Although the foregoing description and accompanying diagrams featured specific embodiments, modifications or variants have been suggested, and others will come readily to mind. If desired, high-power diodes may be inserted in conjunction with the varistors to minimize or eliminate current conduction at power voltages. More complex but otherwise equivalent adapter apparatus may be provided for multi-phase power operations by extending these principles of design and operation, as will be apparent to persons skilled in the related arts after having been made aware of the present disclosure. Inductors and/or capacitors may be included in the circuitry to influence the suppression action.

Other variations may be made in the apparatus and methods of this invention, as by adding, combining, deleting, or subdividing parts or steps, while retaining at least some of the advantages of the invention, which itself is defined in the following claims.

I claim:

1. Plug-and-jack TVSS adapter means having a plurality of power input terminals and a plurality of power output terminals, removably insertable operably between a conventional watt-hour meter and its socket means in a grounded utility box or panel, comprising a non-conductive housing member with terminals mating a pair of the power input and a pair of the power output terminals; and plurality of varistor means supported by the housing member, each varistor means including at least one two-faced varistor,
electrically connected from one of its faces to the power input terminals via a first path, and
electrically connected at its opposite face to the grounded utility box or panel via a second path including conductive laminar ground plane means with an area (both sides) of at least about one-third the housing transverse cross-sectional area.

2. TVSS meter adapter means according to claim 1, wherein such disklike varistors are individually unpackaged and such ground plane member is contiguous with a face of a disklike varistor of each such varistor means.

3. TVSS meter adapter means according to claim 1, wherein such disklike varistors are individually prepackaged and such ground plane member is not contiguous with a face thereof but only with an interconnected conductive terminal therefrom.

* * * * *